Sept. 10, 1929.　　　C. D. MILLER　　　1,727,836
VISCOMETER
Filed June 12, 1922　　　3 Sheets-Sheet 1
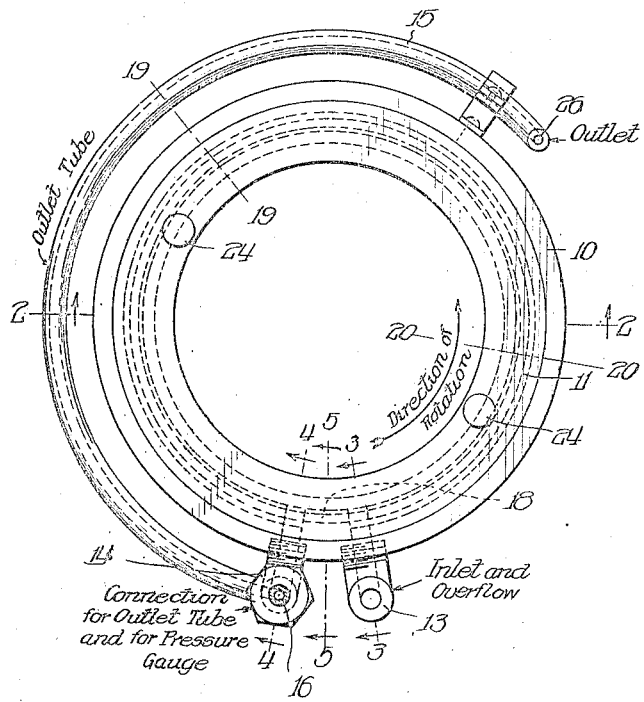
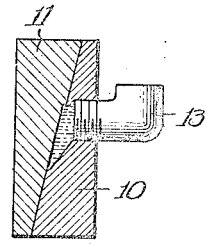
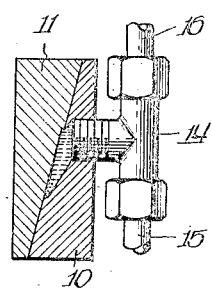
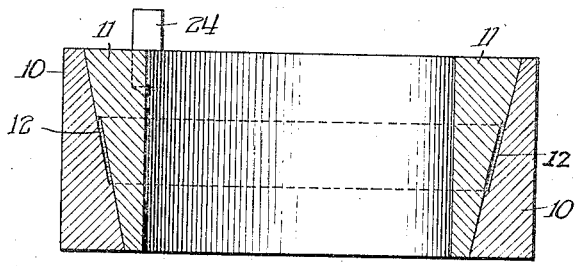
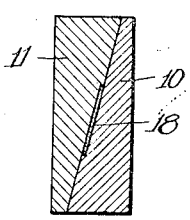
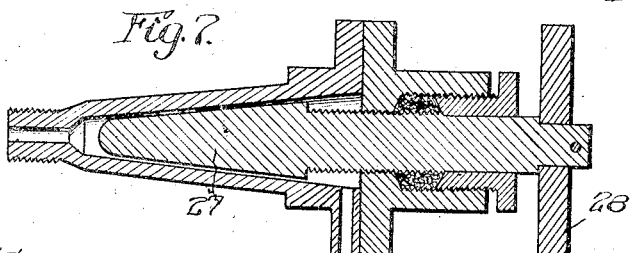
Inventor:
Carl D Miller,

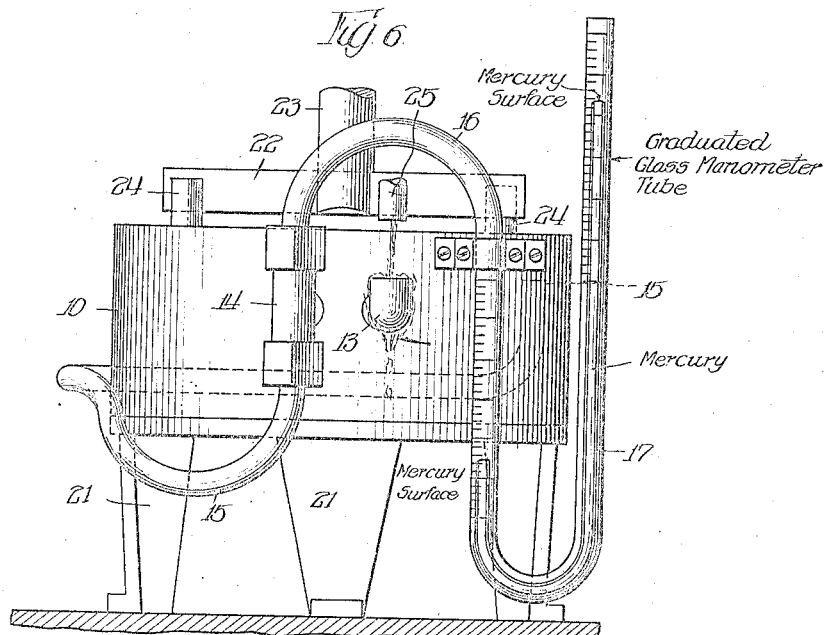
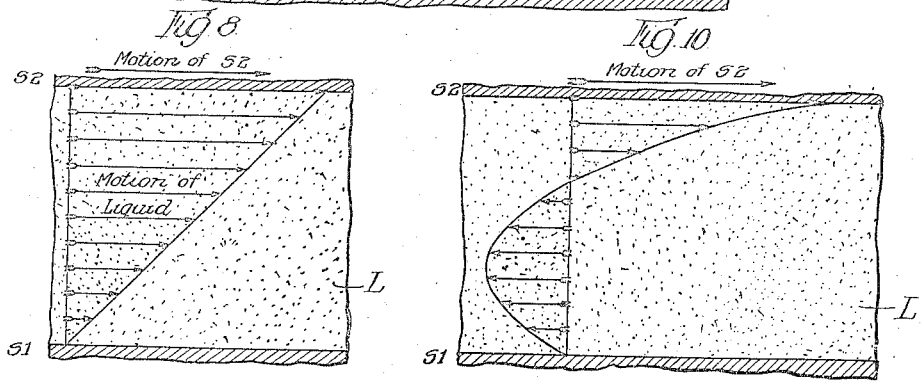
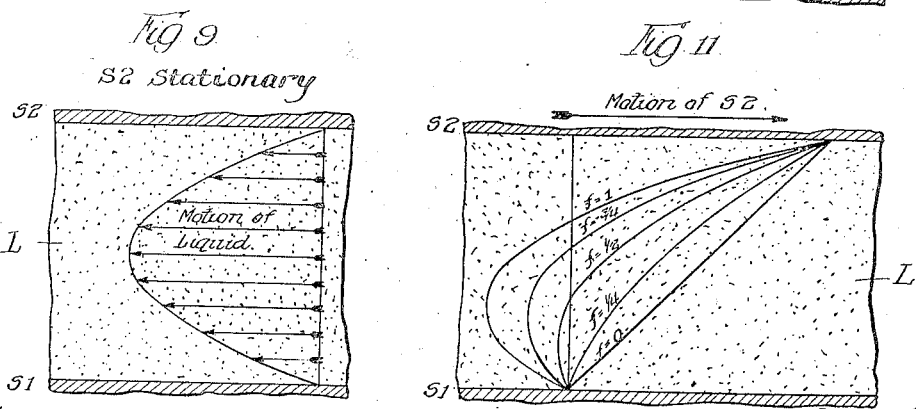

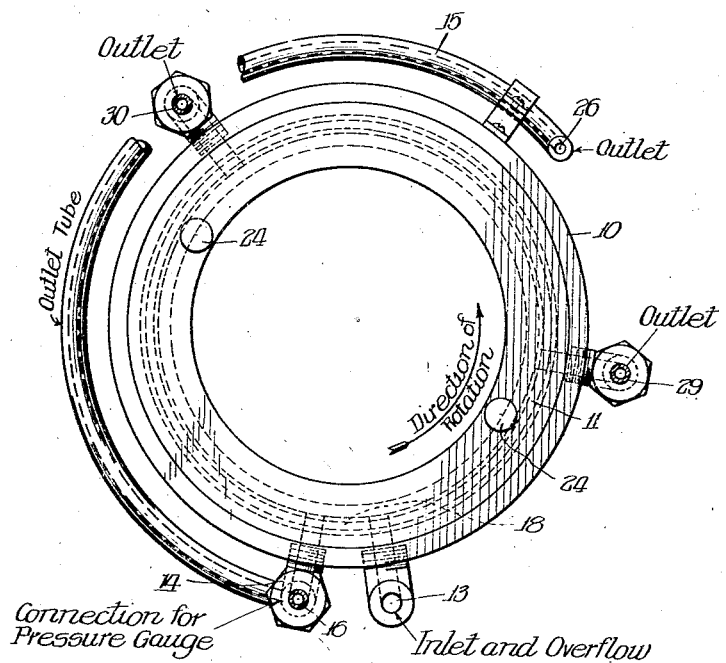

Patented Sept. 10, 1929.

1,727,836

UNITED STATES PATENT OFFICE.

CARL D. MILLER, OF WINNIPEG, MANITOBA, CANADA.

VISCOMETER.

Application filed June 12, 1922. Serial No. 567,657.

The present invention relates to viscometers.

More particularly the present invention relates to methods and means for measuring the viscosity of liquids and, though of general application, will be described more particularly with reference to the measuring of the viscosity of oils.

An object of the present invention is to provide a simple and direct method of measuring viscosity.

A further object is to provide a method for measuring the viscosity of liquids which method adapts itself to a continuous indication of said viscosity.

A further object is to provide a continuously operable, accurate apparatus for indicating the viscosity of liquids.

Further objects will appear as the description proceeds.

Referring to the drawings—

Figure 1 is a plan view of one embodiment of the present invention;

Figure 2 is a sectional view taken along the plane marked by the line 2—2 of Figure 1;

Figure 3 is a sectional view taken along the line 3—3 of Figure 1;

Figure 4 is a sectional view taken along the plane marked by the line 4—4 of Figure 1;

Figure 5 is a sectional view taken along the line 5—5 of Figure 1;

Figure 6 is a view in elevation of the embodiment illustrated in Figure 1;

Figure 7 is a detail;

Figure 7ᵃ shows a modification of the structure shown in Figure 1; and

Figures 8, 9, 10 and 11 are diagrams illustrating the principles of the present invention.

The principles of the present invention are based upon the tendency of liquid to move along with solid surfaces with which it may be in contact. According to the present invention, the pressure created by this action is measured. So long as the velocity of the liquid does not rise above a certain so-called "critical" velocity, the motion of the liquid is what is known as a stream line or non-sinuous motion. Under such conditions, the pressure produced is proportional to the velocity of the moving solid surface and to the true viscosity of the liquid. For the purpose of simplifying the indications, the velocity of the moving solid surface may be kept substantially constant. Regardless of the liquid under test, the pressure produced will be substantially proportional to the viscosity of said liquid. Any convenient means for measuring said pressure may be used and may be calibrated to indicate directly the true viscosity of the liquid under test. By using a manometer, the liquid in which is the same as the liquid under test, the so-called kinematic viscosity of the liquid under test is indicated on an evenly divided scale. By suitable calibration, indications according to any arbitrary system, such as the Saybolt, Redwood, or Engler, may be had.

Referring to Figures 1 to 7 of the drawings, an apparatus is illustrated having a relatively stationary part within which revolves a movable part, said stationary and movable parts having space between them in which is located the fluid, which may be oil, whose viscosity is to be measured. The liquid is drawn along through this space by rotation of the movable part. Means are provided for checking the motion of the liquid whereby to produce a pressure in said liquid, which pressure may be indicated by suitable means.

The relatively stationary part of the apparatus illustrated in Figures 1 to 7 is indicated by the numeral 10, which member will be referred to herein as the stator. Snugly fitting with a running fit within the stator 10 is the rotor 11. The stator 10 and rotor 11 are illustrated as having conical contacting surfaces, an annular space 12 being provided between said stator and rotor for the reception of liquid. It will be understood, of course, that the term "annular" is used in a broad sense. Construction involving eccentricity of the bounding surfaces of said space 12 or variations from absolute uniformity of dimensions of said space will not depart from the scope of the invention. The numeral 13 indicates a pipe connection whereby liquid may be led into the space 12. The numeral 14 indicates an outlet connection leading from the annular space 12, said outlet connection 14 being provided with the outlet pipe 15. The outlet connection 14 may be provided with the tube 16 communicating with the manometer tube 17. The force applied to the liquid which is effective in producing the pressure is applied in a direction which is tangential to the contacting surface between liquid and solid.

Located between the connections 13 and 14 is the filler or stop 18. According to the structure as illustrated in Figure 1, the inlet connection 13 is located in the region where the surface of the rotor 11 is leaving the stop 18 and the outlet connection 14 is located in the region where the surface of the rotor 11 is approaching the stop. It will be clear that instead of combining the outlet connection for the liquid under test with the tube leading to the manometer tube 17, said connections may be separate and distinct. For example, the tube 16 leading to the manometer tube may be retained in the position shown and a separate outlet connection may be placed elsewhere in the periphery of the stator 10. Suitable positions are indicated by the lines 19—19 and 20—20.

Referring now more particularly to Figure 6, it will be noted that the stator 10 may be supported on standards 21—21. The rotor may be mounted in any preferred way. Inasmuch as suitable mounting means will readily occur to those skilled in the art, it is considered unnecessary to describe same in detail. The rotor 11 may be rotated by means of a driving bar 22 mounted on the end of the driving shaft 23. Said driving bar contacts with the upstanding pins 24—24 which project from the upper side of the rotor 11. Though the type of drive is subject to wide variation, the one illustrated has the advantage that it permits the rotor to bear properly in the stator and eliminates lateral pressure from the driving mechanism.

A feed tube 25 may be provided through which the liquid may be conducted to the inlet connection 13. Liquid may be conducted to the inlet connection 13 at a rate somewhat faster than said liquid is actually conducted through the instrument, the excess liquid dripping over the connection 13 into any suitable receptacle placed below said connection 13. Figure 6 illustrates drops of liquid falling from the feed tube 25, excess drops falling below the connection 13. This construction insures a sufficient supply of liquid at a constant level and consequently a constant pressure, the pressure of the supply being determined by the height of the overflow surface, which height is affected only very slightly by variations, within limits, in the amount of liquid coming from the feed tube 25.

Preferably the outlet terminal 26 of the outlet tube 15 is on the same level as the inlet, a construction which is desirable for the purpose of eliminating the effect of gravitational force.

The pressure of the liquid in the space 12 in the region at which the surface of the rotor is approaching the stop 18 is indicated by means of a pressure gauge, which may consist of a mercury manometer tube, which tube may be so designed that the surface of the mercury, when no pressure is being developed within the viscometer, is on a level with the inlet connection 13 and the outlet terminal 26. It will be understood that proper allowance must be made for the effect of the liquid under test in the pressure arm of the manometer tube. If preferred, the necessity for making this allowance may be avoided by connecting the other arm of the manometer to the inlet and having it filled with the liquid under test as far as the mercury, in which event there is no object in having the surface of the mercury, when no pressure is being registered, on a level with the inlet connection 13 and outlet connection 15. If for any reason it is preferred to have the inlet connection 13 and outlet connection 15 at different levels, the readings of the pressure gauge should be corrected by adding or subtracting a certain pressure, which may be determined by allowing liquid to pass through the instrument under the influence of gravity only, the rotor being at rest. It will be understood, moreover, that instead of using mercury in the manometer tube, the rise of the liquid under test in the open arm may be used to indicate pressure.

The invention adapts itself for use with any of the types of pressure gauge known in the art, including indicating and recording gauges and including gauges of the relay type.

The structure referred to in the discussion of Figure 6, in which the liquid under test (instead of mercury) is used in the manometer tube 17, is convenient in giving a direct indication of the ratio between coefficient of viscosity (so-called absolute viscosity) and density. Indicating the co-efficient of viscosity (absolute viscosity) by the letter $n$ and the density by the letter D, said structure renders possible the determination of $n$ over D by direct reading. It will be noted that the open arm of the manometer tube 17 is provided with graduations, which may be utilized for this purpose.

By using mercury or other relatively heavy material differing from the liquid under test in the manometer tube 17, pressure is measured in a way that the density of the liquid under test has little or no effect on the scale reading. Under this condition, the values of $n$ (absolute viscosity) are indicated directly.

Figure 7 illustrates an adjustable outlet connection, the outflow of liquid being controlled by the needle valve 27, the position of which may be controlled by the handle 28.

Figure 7ª illustrates the modification hereinabove referred to in which outlets are provided between the inlet 13 and the pressure gauge connection 14. Two such outlets are shown, which bear the numerals 29 and 30. There is also the outlet provided through the pressure gauge connection 14, which communicates with the tube 15. A very important advantage accrues from having an outlet at a point between the inlet and the pressure gauge connection in that a suction on the outlet is developed by the action on the oil within the space 12 between the inlet and said outlet. This suction serves to overcome inlet resistance, which may be considerable, and which may vary considerably from time to time even with no change in the character of the oil. In practice the instrument will be held at a definite temperature, at which it measures the viscosity of the oil. The temperature of the oil to be tested will in practice be at the temperature of the instrument as it enters the annular space 12. The suction required to draw the oil through the inlet depends upon the temperature at which the oil is supplied, since this affects the thickness of the oil as it enters. This suction is all taken up between the inlet and the first of the outlets 29 or 30 that is open, and it does not affect the pressure developed at the connection 14. According to the present invention, if a different liquid is delivered to the machine, it will automatically replace the liquid previously delivered, and the pressure gauge will then indicate the viscosity of the liquid being fed in. Outlet 29 may be open, and both outlet 30 and the outlet through the tube 15 may be closed. This will give the highest range of pressure; or outlet 30 may be open and outlet 29 and connection 15 may be closed, giving pressures only half as great, and, with the same pressure gauge, permitting the measurement of viscosities twice as great as in the case with outlet 29 open and outlet 30 and connection 15 closed; or, with either outlet 29 or outlet 30 open, the oil may be allowed to flow through the tube 15 with nothing but the frictional resistance of the tube to oppose the flow, and still lower pressures obtained, permitting the measurement of still lower viscosities with the same pressure gauge. With the given oil at the same temperature, the pressure developed with only outlet 29 open is about twice as great as that with only outlet 30 open, since the length of the annular passage 12 from outlet 29 around to the pressure gauge connection 14 is about twice that from outlet 30 to the connection 14. With flow through the tube 15, the pressure developed depends upon the resistance offered by the tube to the passage of the oil, and this depends upon the length and diameter of the tube. It can readily be made a very small fraction of the pressure with only outlet 30 open, permitting the measurement of correspondingly greater viscosities without change of pressure gauge. With a single range instrument, but one outlet is required, but it must be between the inlet 13 and the pressure gauge connection 14 to make the pressure developed independent of the suction required to overcome the inlet resistance.

The performance of the described embodiment of the present invention may be illustrated by means of the diagrams illustrated in Figures 8 to 11 inclusive, which diagrams show the conditions of liquid contained between relatively moving solid surfaces. The liquid which is indicated by the letter L is contained between the surfaces S—1 and S—2, the upper surface S—2 having a motion to the right in Figures 8, 9, 10 and 11, as indicated by the double-headed arrows. In Figure 8 the liquid encounters no obstruction, the only hindrance to its motion along with surface S—2 being its adhesion to the stationary surface S—1. The motion of the liquid in the various strata is illustrated by single-headed arrows, said motion varying uniformly between said surfaces S—1 and S—2. In Figure 9 the surfaces S—1 and S—2 are both stationary and the liquid flows to the left under the influence of the pressure at the right. According to the diagram shown in Figure 9, the motion of the liquid increases gradually from that at the surfaces S—1 or S—2 to a maximum midway between them.

Figure 10 represents the combined motions illustrated in Figures 8 and 9 and illustrates the result of the complete stoppage of the liquid by the stop 18, it being assumed that the stop is applied to the stationary surface S—1 somewhere at the right of the figure. According to the diagram shown in Figure 10, there is a motion to the right of the liquid adjacent to the upper surface S—2, which motion falls off rapidly to zero at a point above the middle, and below this point the motion is to the left, as indicated by the single-headed arrows. The flow to the right is exactly balanced by the flow to the left, the result being a circulating motion of the liquid, the upper layers of which move along with the upper surface S—2 to the point of stoppage, the liquid returning along the lower surface S—1. Figure 11 illustrates the effect of partial stoppage of the liquid. In this figure the curve marked $f=1$ shows the motion obtained in the case of complete stoppage, all of the liquid carried to the right by the direct effect of the motion of surface S—2 being returned by the effect of the pressure created. The curve marked $f=3/4$ illustrates the case in which 3/4 of the liquid is returned by the pressure, $\frac{1}{4}$ of said liquid escaping through the outlet. The curves marked $f=\frac{1}{2}$, $f=\frac{1}{4}$ and the straight line marked $f=0$ apply similarly. It may be noted that when $f=\frac{1}{2}$ a large part of the liquid near the stationary surface S—1 is in relatively slow motion. This is undesirable, as it will increase the lag of the instrument in its response to a change in the viscosity of the liquid being supplied to it. For this reason, values of $f=0$ to $1/4$ and from $3/4$ to 1 are, generally speaking, preferable to values between $\frac{1}{4}$ and $3/4$. For the position of the parts as illustrated in Figures 1 to 6 inclusive, the outlet tube is preferably of such length and diameter that $f$ is not over $\frac{1}{4}$. The flow of liquid between the rotor 11 and stator 10 is represented throughout by a curve corresponding to the particular value of $f$. For the outlet connection at the position 19—19 or 20—20 of Figure 1, the preceding statements hold with regard to that part of the liquid between the inlet and outlet connections, but for the part from the outlet connection to the gauge connection and the stop 18 the flow is represented by the curve marked $f=1$. With the outlet connection in such a position as that illustrated by the line 19—19, parts being adjusted as above referred to, there is no complete circulation of the liquid, the liquid which returns from the stop passing through the outlet and not returning again to the stop.

The diagrams showing the motion of the liquid are based upon the following formulæ:

Let $a$ represent the distance between the stationary surfaces; $x$, the distance between the stationary surface and any layer in the liquid; $V$, the velocity of the moving surface; $v$, the velocity of any layer in the liquid; $w$, the dimension of the liquid stream perpendicular to the plane of the diagrams; $Q$, the volume of liquid which flows in unit time under the condition of unobstructed flow, as illustrated in Diagram A; $f$, the fractional part of $Q$ which flows in the opposite direction to that of the moving surface, because of the pressure created by obstruction to the flow which goes directly along with the moving surface. Then $$Q = \frac{1}{2} w a V \quad (1)$$

$$\frac{v}{V} = \frac{x}{a} - f \cdot 3\left(1 - \frac{x}{a}\right)\frac{x}{a} \quad (2)$$

Further, let $L$ denote the length of the liquid stream between the surfaces; $n$, the viscosity of the liquid; $p$, the pressure developed in the length $L$. Then the flow $fQ$ caused by pressure only, as illustrated in Diagram B, is given by $$fQ = \frac{wa^3}{12L} \cdot \frac{p}{n} \quad (3)$$

$$p = f(6LV/a^2)n \quad (4)$$

With regard to the outlet tube, let $l$ denote its length and $d$ its diameter. The volume $(1-f)Q$ of liquid passes through it in unit time under the influence of the pressure $p$. $l$ and $d$ must comform to the following formula:

$$\frac{d^4}{l} = \frac{32}{3\pi f}(1-f)W\frac{a^3}{L} \quad (5)$$

If the adjustable form of outlet is used, then let $b$ denote the separation of the surfaces between which the liquid passed; $l$, the length of the path of the liquid between these surfaces; $c$, the mean circumference. Then approximately, $$(1-f)Q = \frac{cb^3}{12l} \cdot \frac{p}{n} \quad (6)$$

$$\frac{cb^3}{l} = \frac{1}{f}(1-f)W\frac{a^3}{L} \quad (7)$$

The preceding formulæ are given for the centimeter-gram-second, or c. g. s. system of units. $Q$ is in cubic centimeters per second, $w$ and $a$ are in centimeters, and $V$ and $v$ are in centimeters per second, $x$ is in centimeters, $f$ is a pure number, $L$, $l$, $c$ and $b$ are in centimeters, $p$ is in dynes per square centimeter, and $n$ is in the c. g. s. unit of viscosity, sometimes called the "poise". The so-called "dimensions" of $n$ are given by $$[n] = [ML^{-1}T^{-1}] \quad (8)$$

As applied to the instrument described, the formulæ are approximate only. They apply strictly to plane surfaces, while the surfaces between which the motion occurs in this instrument are not plane, but conical. The pressure developed is still proportional to the viscosity, in the case of the conical surfaces. The proportionality constant may be calculated, approximately, by the formulæ here given, and it may be determined with more exactness by experiment with liquids of known viscosity. For the proportionality to hold, there are two limitations on the velocity of the liquid. One, mentioned previously, is that the critical velocity should not be exceeded. That is, the flow must be of the stream-line type, and not sinuous or turbulent. The other is that the force or pressure expended in overcoming the inertia of the liquid, should be negligible as compared to that expended in overcoming the resistance due to the internal fluid friction, or viscosity, of the liquid. In setting in motion a stream of fluid, the force required to overcome the inertia of the fluid is given by $$F = du^2 A \quad (9)$$

in which $F$ is the force in dynes, $d$ is the density in grams per cubic centimeter, $u^2$ is the average squared velocity in centimeters per second, and $A$ is the cross-sectional area of the stream, in square centimeters. The force $F$ is distributed over the area in which it acts, in a way corresponding to the velocity of the stream at different points. If the effect of this force is not negligible, correction can be made for it. This correction is particularly simple for liquids such as oils, all having approximately the same density, $d$. For in this case, considering the velocity $u$ to be the same, and A being the same, the force F is constant, and the net result is that a fixed correction is to be applied to the reading of the pressure gauge. A correction of this nature is sometimes referred to as a correction for kinetic energy.

In many cases it is necessary to regulate the temperature of liquid under test in order to maintain said temperature at a substantially constant value. For this purpose the instrument may be immersed in a liquid such as oil. One important advantage produced by the present invention is the fact that, regardless of the viscosity of the liquid, the rate of flow is constant, assuming constant velocity of the rotor 11, as diagrammatically indicated in Figure 8. This advantage may be utilized in procuring test readings according to arbitrary scales, such as the Saybolt, Redwood, or Engler, referred to above. It should be noted that the means for opposing a frictional resistance to the flow of liquid under test results largely from frictional forces within the liquid, rather than from the inertia of the liquid.

I claim:

1. The method of measuring the viscosity of a liquid which consists in admitting said liquid between two surfaces in contacting relation with each of said surfaces, said surfaces being adjacent through extended areas, one of said surfaces moving relative to the other, checking the flow of said liquid, allowing said liquid to pass out from between said surfaces at a region between the regions of inlet and checking of said liquid, and measuring the resulting pressure in said liquid at said region of checking.

2. The method of measuring the viscosity of a liquid which consists in admitting said liquid between two surfaces in contacting relation with each of said surfaces, said surfaces being adjacent through extended areas, one of said surfaces moving relative to the other, checking the flow of said liquid, allowing said liquid to pass out from between said surfaces at a region between the regions of inlet and checking of said liquid under substantially the same gravitational force under which said liquid was admitted, and measuring the resulting pressure in said liquid at said region of checking.

3. Apparatus for measuring the viscosity of a liquid comprising a rotor and a stator having adjacent surfaces providing an annular space, means for introducing liquid to said space, means for leading liquid from said space, means for measuring the pressure of the liquid within said space, and means for checking the flow of said liquid within said apparatus.

4. Apparatus for measuring the viscosity of a liquid comprising a rotor and a stator providing between them a liquid receiving passageway, means for conducting liquid to said passageway, means for conducting liquid from said passageway, liquid checking means between said inlet means and said outlet means, and means for measuring the pressure of the liquid within said passageway.

5. The method of measuring the viscosity of a liquid which consists in applying said liquid with a constant gravitational force to two opposed surfaces having relative to one another a substantially constant velocity, causing the flow of said liquid to be checked, causing said liquid to be delivered from between said two surfaces at a region between the region of application to said surfaces and the region of checking the flow of said liquid, and measuring the pressure created within said liquid at the region of checking the flow of said liquid.

6. The method of measuring the viscosity of a liquid which consists in applying said liquid to two opposed surfaces having relative to one another a substantially constant velocity, causing the flow of said liquid to be checked, causing said liquid to be delivered from between said two surfaces at a region between the region of application to said surfaces and the region of checking the flow of said liquid, and measuring the pressure created within said liquid at the region of checking the flow of said liquid.

7. Apparatus for measuring the viscosity of a liquid comprising a rotor and a stator having adjacent surfaces providing an annular space, means for introducing liquid to said space, means for leading liquid from said space, means for checking the flow of liquid in said space, and means for measuring the pressure of the liquid within said space, said pressure measuring means being disposed adjacent to said checking means, said means for leading liquid from said space being disposed between said means for introducing liquid and said measuring means.

8. Apparatus for measuring the viscosity of a liquid comprising a rotor and a stator, said rotor and stator providing between them an annular passageway, means for conducting liquid to said passageway with a substantially constant gravitational force, means for conducting liquid from said passageway at a level at which the gravitational force is substantially equal to that at which liquid is conducted to said passageway, means in said passageway for checking the flow of said liquid, and means for measuring the pressure of the liquid within said passageway, said means being disposed adjacent to said checking means, said means for conducting liquid from said passageway being disposed between the means for conducting liquid to said passageway and said measuring means.

9. Apparatus for measuring the viscosity of a liquid comprising two members having cooperating circumferential surfaces providing between them an annular passageway, and means for moving one of said members relative to the other whereby to impart motion to the liquid in said passageway.

10. Apparatus for measuring the viscosity of a liquid comprising a rotor and a stator, said rotor and stator providing between them an annular passageway, means for conducting liquid to said passageway with a substantially constant gravitational force, means for conducting liquid from said passageway at a level at which the gravitational force is substantially equal to that at which liquid is conducted to said passageway, means for driving said rotor, and means for measuring the pressure of the liquid within said passageway.

11. Apparatus for measuring the viscosity of a liquid comprising a rotor and a stator, said rotor and stator providing between them an annular passageway, means for conducting liquid to said passageway with a substantially constant gravitational force, means for conducting liquid from said passageway at a level at which the gravitational force is substantially equal to that at which liquid is conducted to said passageway, means for driving said rotor, means for checking motion of liquid within said passageway, and means for measuring the pressure of liquid within said passageway, said checking means being located adjacent to and between said inlet means and said pressure measuring means.

12. The method of measuring the viscosity of a liquid which consists in admitting said liquid between two surfaces in contacting relation with each of said surfaces, said surfaces being adjacent through extended areas, one of said surfaces moving relative to the other, checking the flow of said liquid, allowing said liquid to pass out from between said surfaces, and measuring the resulting pressure in said liquid at said region of checking.

13. The method of measuring the viscosity of a liquid which consists in admitting said liquid between two surfaces in contacting relation with each of said surfaces, said surfaces being adjacent through extended areas, one of said surfaces moving relative to the other, checking the flow of said liquid, allowing said liquid to pass out from between said surfaces under substantially the same gravitational force under which said liquid is admitted, and measuring the resulting pressure in said liquid at said region of checking.

14. The method of measuring the viscosity of a liquid which consists in applying said liquid with a constant gravitational force to two opposed surfaces having relative to one another a substantially constant velocity, causing the flow of said liquid to be checked, causing said liquid to be delivered from between said two surfaces, and measuring the pressure created within said liquid at the region of checking the flow of said liquid.

Signed at Chicago, Illinois, this 9th day of June, 1922.

CARL D. MILLER.